United States Patent
Jayaraman et al.

(10) Patent No.: US 10,289,219 B2
(45) Date of Patent: May 14, 2019

(54) COMMUNICATING WITH AN UNSUPPORTED INPUT DEVICE

(71) Applicants: Hewlett-Packard Development Company, L.P., Houston, TX (US); Karthik Jayaraman, Sunnyvale, CA (US); Molly Joy, San Jose, CA (US)

(72) Inventors: Karthik Jayaraman, Sunnyvale, CA (US); Molly Joy, San Jose, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 113 days.

(21) Appl. No.: 15/032,801

(22) PCT Filed: Oct. 31, 2013

(86) PCT No.: PCT/IN2013/000675
§ 371 (c)(1),
(2) Date: Apr. 28, 2016

(87) PCT Pub. No.: WO2015/063782
PCT Pub. Date: May 7, 2015

(65) Prior Publication Data
US 2016/0252974 A1 Sep. 1, 2016

(51) Int. Cl.
*G06F 3/038* (2013.01)
*G06F 3/01* (2006.01)
(Continued)

(52) U.S. Cl.
CPC .............. *G06F 3/038* (2013.01); *G06F 3/017* (2013.01); *G06F 3/0227* (2013.01); *G06F 3/0238* (2013.01); *G06F 3/0346* (2013.01)

(58) Field of Classification Search
CPC ........ G06F 3/038; G06F 3/017; G06F 3/0227; G06F 3/0238; G06F 3/0346;
(Continued)

(56) References Cited

U.S. PATENT DOCUMENTS 6,057,845 A * 5/2000 Dupouy ............... G06F 3/0481
382/186
6,535,931 B1 3/2003 Celi, Jr.
(Continued)

FOREIGN PATENT DOCUMENTS

CN 101644989 12/2011
CN 102487457 6/2012
(Continued)

OTHER PUBLICATIONS

"Gingerbread", < http://developer.android.com/about/versions/android-2.3-highlights.html >, 2011.
(Continued)

*Primary Examiner* — Richard J Hong
(74) *Attorney, Agent, or Firm* — HPI Patent Department

(57) ABSTRACT

Systems and methods of communicating with an unsupported input device to make an application interact with the unsupported input device are described herein. The method comprises obtaining, for the application to be subscribed to the unsupported input device, a mapping of each of a plurality of hotkeys with a corresponding function performed in the application. The method further comprises retrieving a list of universal identifiers, where each of the universal identifiers corresponds to an unsupported input of the unsupported input device. Also, each of the universal identifiers is tagged with a function to be performed in the application in response to the corresponding unsupported input. The method also includes generating a configuration map for the application. The configuration map comprises a mapping of at least one universal identifier, from amongst the list of universal identifiers, with at least one of the plurality of hotkeys.

15 Claims, 6 Drawing Sheets

(51) Int. Cl.
*G06F 3/02* (2006.01)
*G06F 3/023* (2006.01)
*G06F 3/0346* (2013.01)

(58) Field of Classification Search
CPC ........ G06F 3/0481; G06F 3/0488; G06F 8/63; G06F 9/545; G06F 13/385; H04L 67/10
See application file for complete search history.

(56) References Cited

U.S. PATENT DOCUMENTS

| | | | |
|---|---|---|---|
| 7,631,124 | B2 | 12/2009 | Lockhart et al. |
| 8,351,773 | B2 | 1/2013 | Nasiri et al. |
| 2006/0253859 | A1* | 11/2006 | Dai ................... G06F 9/545 719/321 |
| 2007/0236472 | A1 | 10/2007 | Bentsen et al. |
| 2008/0059782 | A1* | 3/2008 | Kruse .................... G06F 8/63 713/1 |
| 2008/0250429 | A1 | 10/2008 | Lockhart et al. |
| 2010/0235425 | A1* | 9/2010 | Holden ............... G06F 13/385 709/202 |
| 2011/0001699 | A1 | 1/2011 | Jacobsen et al. |
| 2013/0031618 | A1 | 1/2013 | Momchilov |
| 2014/0195582 | A1* | 7/2014 | Sherwood .............. H04L 67/10 709/201 |
| 2015/0169073 | A1* | 6/2015 | Isayama ............... G06F 3/0488 715/765 |

FOREIGN PATENT DOCUMENTS

| | | |
|---|---|---|
| CN | 102637116 | 8/2012 |
| WO | WO-2013036959 | 3/2013 |

OTHER PUBLICATIONS

"Single-zone 3D Gesture Controller Data Sheet", Microchip Technology, Nov. 12, 2012. < http://ww1.microchip.com/downloads/en/DeviceDoc/41667A.pdf >.

Brandom; "Leap Motion Reveals First Footage of Windows 8 Gesture Control", < http://www.theverge.com/2013/5/20/4349498/leap-motion-reveals-first-footage-of-windows-8-gesture-control >, May 20, 2013.

International Search Report & Written Opinion received in PCT Application No. PCT/IN2013/000675, dated Jul. 30, 2014, 14 pages.

* cited by examiner

COMMUNICATING WITH AN UNSUPPORTED INPUT DEVICE

BACKGROUND

A computing device, such as a laptop computer, a desktop computer and a workstation, may execute various applications. The computing device may include or be connected to input devices, such as keyboard, mouse, stylus, and keypad, to allow a user to communicate with the applications. Different computing devices support different types of input devices. For example, a computing device may support a mouse or a keyboard, and may accept user inputs provided through these input devices. Another computing device may accept voice commands as user inputs. Thus, users communicate with the applications executing on the computing devices through the input devices supported by the computing devices.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
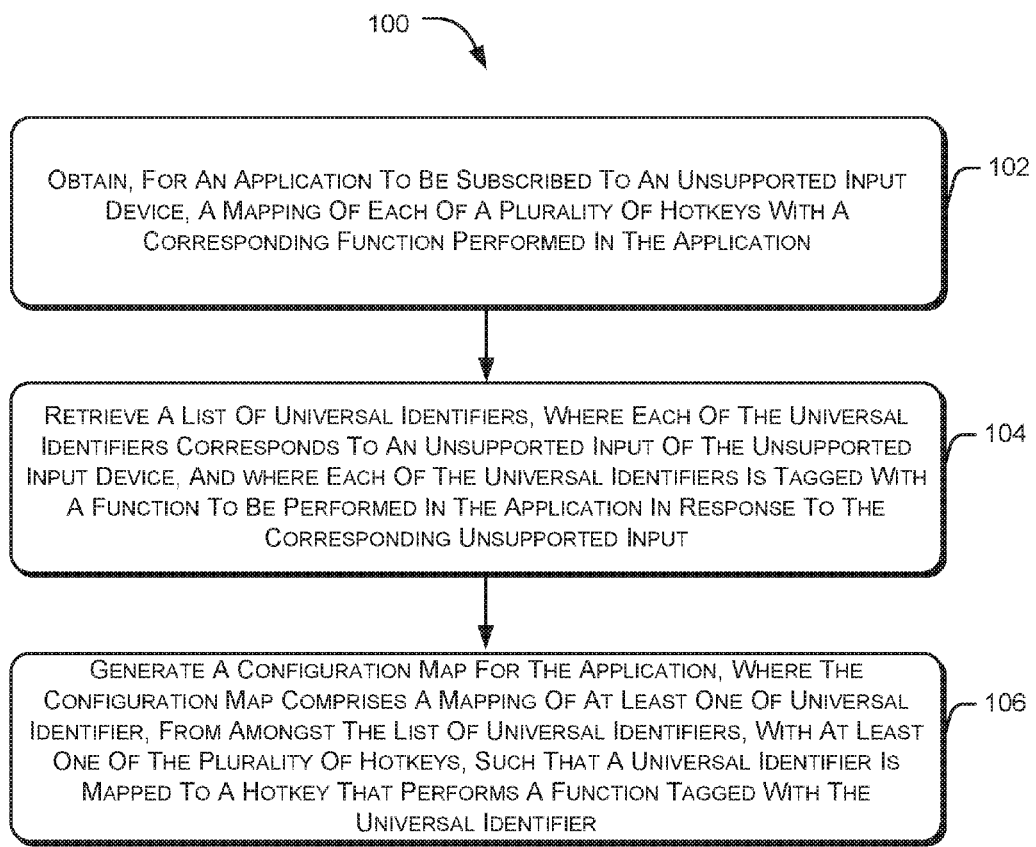
FIG. 1 illustrates a method for subscribing an application to an unsupported input device, according to an example of the present subject matter.

Various applications executing on operating systems (OS) of devices, for example, communication devices and computing devices, support different user inputs. For example, a text editor may support user inputs provided through a mouse or a keyboard. Accordingly, the text editor may understand mouse events or keyboard events, such as click or scroll events of the mouse or key trigger events of the keyboard. In another example, an instant messenger may support user inputs provided through a microphone and may accordingly react to voice commands, such as 'send picture' and 'open file'.

Typically, an application running on an OS of a device may support a set of input devices and can accept user inputs provided through such supported input devices. However, such applications may not support other input devices. For example, a browser may support a keyboard as an input device and thus react to a keyboard event by moving to a previous page upon triggering of backspace key. The browser may not support a gesture input provided through a camera module of a camera used as an input device and may fail to move to the previous page in response to a right-to-left hand movement. On the other hand, a gaming application, running on the device and supporting the camera module, may perform a specific task in response to the gesture input provided through the camera module.

Making an application support an input device, which the application has not been originally developed to support, involves extensive application redevelopment or substantial coding. Referring to the previous example, to make the browser support the camera, additional coding is done. Coding requires skills and also consumes a lot of resources, such as man hours and capital. Additionally, if the coding is carried out by anyone other than the original developer of the application, unavailability of the source code and lack of specific knowledge of the application may pose further difficulties.

The above technical challenges may be further compounded for applications which are sandboxed. Sandboxed applications may not access all capabilities of the OS of the device on which they may be running. The sandboxed applications make a declaration of the capabilities of the OS that the sandboxed applications use for their operation. Thereupon, the sandboxed applications are imparted with the declared capabilities and no additional capabilities may be imparted to them. For example, if a sandboxed application has declared to detect touchpad events, i.e., inputs received through a touchpad, the sandboxed application may not be imparted with a capability to detect gesture events, i.e., inputs received through a camera module of a camera. Thus, the sandboxed applications, in spite of additional coding, may not support the input devices, which the sandboxed applications have not declared to support.

Systems and methods of communicating with an unsupported input device to make an application capable of supporting the unsupported input device are described here. A keyboard being a basic mode of input is supported by most of the applications. Applications that do not support more recent and advanced mode of inputs, such as 3D motion inputs or inputs by means of movement of eyeballs typically support keyboard events. For the purposes of present discussion, the applications that do not support an input device are, however, considered to be supporting a keyboard.

To interact with a given application running on an OS of a device, one or more keys of the keyboard of the device are triggered. The application performs a specific function in response to triggering of the one or more keys of the keyboard. For example, in response to the triggering of the back arrow, an image viewer may upload a previous image, while in response to the up arrow, a word processor may scroll up a page. The one or more keys of the keyboard that trigger a function may be called as hotkeys for that function. A mapping of the hotkeys with corresponding functions performed by the hotkeys is available for each application. In one scenario, for an application, the mapping of the hotkeys with the corresponding functions performed by the hotkeys may be made available by a developer of the application. For example, the mapping of the hotkeys with the corresponding functions may be published on the Internet or may be available through a help menu of the application.

In one embodiment of the present subject matter, the mapping of the hotkey with the corresponding function is used for making an application interact with an unsupported input device. Consider an example where a native browser is to be made capable of supporting a camera module of a camera, such that the native browser may understand gesture events, such as a right-to-left hand movement, a left-to-right hand movement, and a top-to-bottom hand movement. In the present example, a user may want the native browser to move to the previous page upon his performing a right-to-left hand movement. A hotkey corresponding to the function of moving the native browser to the previous page is identified from the mapping of the hotkey with the corresponding function. To move the native browser to the previous page in response to the right-to-left hand movement, the hotkey corresponding to the function of moving the native browser to the previous page is simulated within the OS, for the application, when the user performs the right-to-left hand movement.

Thus, when an unsupported input for performing a function is used to communicate with an application, a hotkey corresponding to the function is simulated to enable the application to perform the function. Thus, the application may interact with the unsupported input device without any additional code written for the application or without redevelopment of the application. As a result, even a considerably less skilled user is enabled to make the application interact with unsupported inputs from the unsupported input device utilizing less time and resources, and without having knowledge of source code of the application.

Further, as mentioned above, an application may not support an input device because the application may be a sandboxed application that has not declared its capabilities with respect to the input device. However, the capability of interacting with the OS on the basis of receiving hotkeys is typically declared by sandboxed applications; therefore the hotkeys can be easily accepted by the sandboxed applications. Thus, the sandboxed applications, in spite of not supporting an input device, may be made capable of supporting inputs from the unsupported input device.

The methods and the systems for making applications interact with various unsupported input devices, as described herein, may be implemented in various commercially available computing systems and communication systems, such as personal computers, network servers and servers. In one implementation, the applications may include native desktop applications, such as a Google Chrome™ browser, a Firefox® browser, and an Internet Explorer® browser, and sandboxed applications, such as a windows 8® store application.

In one embodiment of the present subject matter, to make an application interact with an unsupported input device, the application is first subscribed to the unsupported input device. In one example, the unsupported input device may be a three dimensional (3D) motion sensing controller. Further, unsupported inputs corresponding to the 3D motion sensing controller may be gesture events, such as 3D motions or inputs by means of movement of eyeballs. For instance, 3D motions may be movement of hands, movement of face, etc. According to an example, the 3D motion sensing controller may be a leap Motion™ sensor. The leap Motion™ sensor can track in-air movement of hands and fingers.

For subscribing the application to the unsupported input device, a list of various unsupported inputs corresponding to the unsupported input device is obtained. For example, in case the unsupported input device is a 3D motion sensing controller, the corresponding unsupported inputs are gesture events, such as 3D motions. Accordingly, the list of various unsupported inputs, in this case, comprising various gesture events, such as a right-to-left hand movement, a left-to-right hand movement, a top-to-bottom hand movement, a bottom-to-top hand movement or any custom developed 3D gesture events, are obtained. Each of these unsupported inputs has a universal identifier assigned to them. The universal identifier is a distinctly identifiable name of an unsupported input.

In one example, the universal identifier may be a name of a gesture event. For example, a left-to-right hand movement may have a universal identifier LEFT-TO-RIGHT SWIPE associated with it.

In one implementation, the universal identifiers may be assigned to the unsupported inputs by a user. Once a universal identifier is assigned to each of the unsupported inputs, a function that each unsupported input intends to perform in the application is also tagged with the universal identifier. For example, to an unsupported input, left-to-right hand movement, a universal identifier 'LEFT-TO-RIGHT SWIPE' may be assigned and the function of moving to next page, that the unsupported input may intend to perform in the subscribed application, may be tagged.

Based on the functions tagged with the universal identifiers, hotkeys performing the functions in the application are mapped to the corresponding universal identifiers. As mentioned previously, an application performs a specific function in response to triggering of the one or more keys of the keyboard. For instance, in an application, a function 'move to next page' may be tagged with a universal identifier 'LEFT-TO-RIGHT SWIPE'. Then a hotkey for moving to the next page in the application may be the right arrow of the keyboard. Accordingly, the right arrow is mapped to the universal identifier 'LEFT-TO-RIGHT SWIPE'.

The mapping of the universal identifiers to corresponding hotkeys of the application is called as a configuration map. Although, it has been described that the configuration map is created for a single application, configuration maps may be created for multiple applications, such that one configuration map is created for each of the multiple applications. In one implementation, the configuration maps of the multiple applications may reside in a configuration file. Accordingly, the configuration file may include mapping of universal identifiers and corresponding hotkeys for several applications.

It may also be mentioned that from amongst several applications that may be executed on a device, a user may select one or more applications to be made capable of supporting an unsupported input device. For example, based on a selection made by the user, three out of five applications that may be executing on the device may be subscribed in the configuration file and accordingly these three applications may support the unsupported input device for which they have been subscribed. The applications that have been subscribed for an unsupported input device may be called as subscribed applications.

Once the configuration file comprising configuration maps of several subscribed applications is available to a device executing the subscribed applications, the configuration file may be used to make the subscribed applications interact with an unsupported input device, for example, a 3D motion sensing controller that may be coupled to the device executing the subscribed applications.

For example, in one of the subscribed applications, a hotkey 'right arrow', may perform a function of moving to the next page. In a configuration map of the subscribed application, this hotkey may be mapped to the universal identifier 'LEFT-TO-RIGHT SWIPE' which corresponds to a gesture event of left-to-right hand movement of a user. Accordingly, when a user moves his hand from left-to-right, the 3D motion sensing controller captures the gesture event and universal identifier associated with this gesture event, i.e., RIGHT-TO-LEFT SWIPE in the present example, is determined by the device. Thereupon, the configuration file is accessed. In case the configuration file has configuration maps of several subscribed applications, a configuration map of the present subscribed application with which the user is interacting is identified from amongst the configuration maps of the several subscribed applications. The hotkey mapped to the determined universal identifier is identified from the configuration map for the present application. In the present example, the hotkey mapped to the universal identifier LEFT-TO-RIGHT SWIPE is the right arrow.

The identified hotkey is simulated by the OS of the device and is sent to the subscribed application with which the user is interacting, to perform the function associated with the hotkey, which in this case is to move to the next page. Thus, in effect, the subscribed application is moved to the new page in response to the right-to-left hand movement performed by the user. Various unsupported inputs may be communicated to the subscribed applications accordingly.

Further, since a user has a flexibility to tag functions and unsupported inputs for each application he subscribes, he may customize the applications based on his preference. For instance, the user may tag a function 'move to next page' with the universal identifier 'LEFT-TO-RIGHT SWIPE' and tag a function 'scroll down the page' to the universal identifier 'TOP-TO-BOTTOM SWIPE'. Also, the user may tag functions and the unsupported inputs differently for different applications. For example, the user may tag the function 'scroll down the page' to the universal identifier 'TOP-TO-BOTTOM SWIPE' for one application while he may tag the function 'move to previous page' to the same universal identifier 'TOP-TO-BOTTOM SWIPE' for another application. Thus, the user may tag functions and unsupported inputs based on his preference.

The above systems and the methods are further described in conjunction with the following figures. It should be noted that the description and figures merely illustrate the principles of the present subject matter. Further, various arrangements may be devised that, although not explicitly described or shown herein, embody the principles of the present subject matter and are included within its spirit and scope.

The manner in which the systems and methods for making applications interact with various unsupported input devices are explained in detail with respect to FIGS. 1 to 6. While aspects of described systems and methods for communicating with the various unsupported input devices can be implemented in any number of different computing systems, environments, and/or implementations, the examples and implementations are described in the context of the following system(s).

Figure 2:
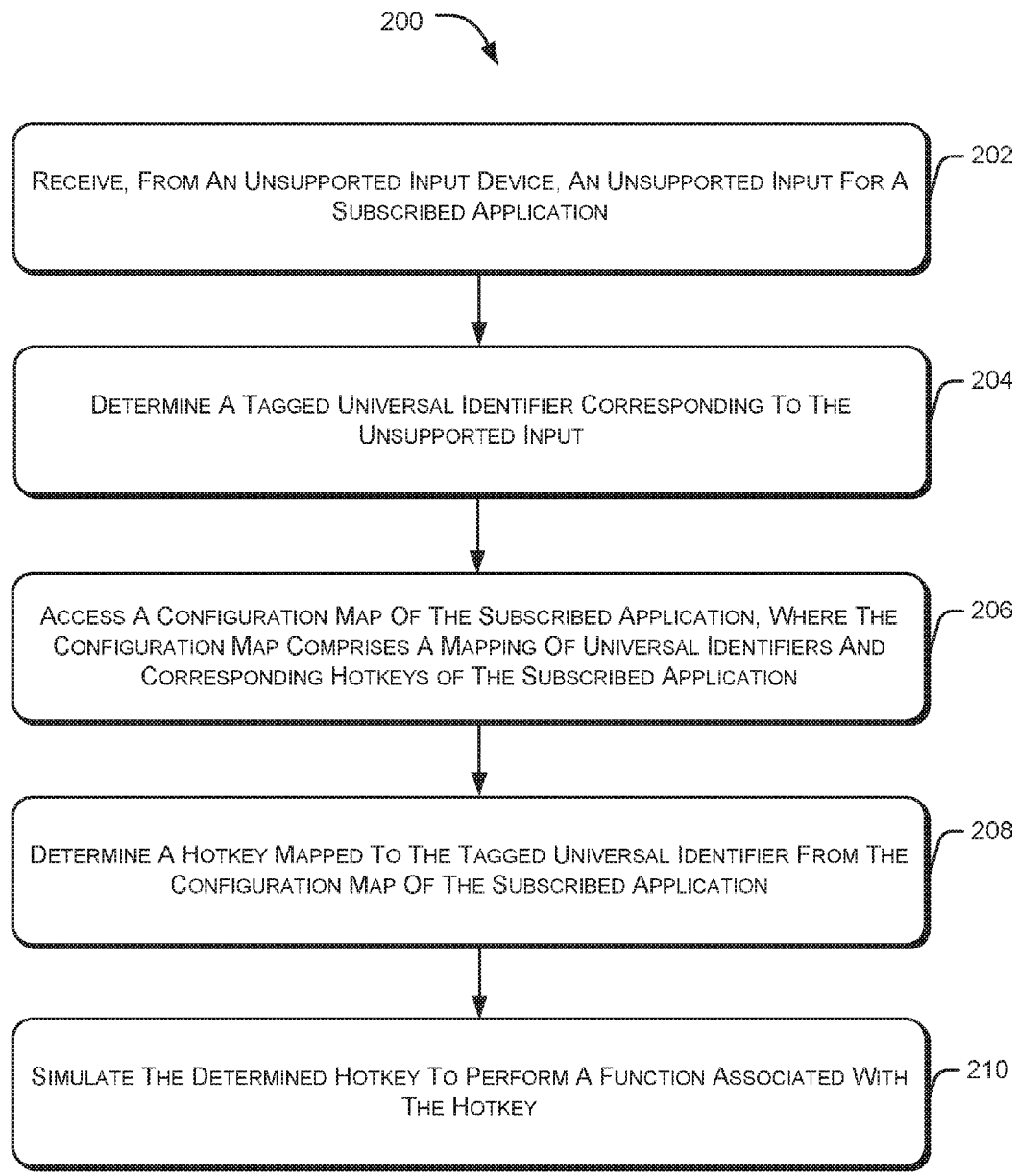
FIG. 2 illustrates a method for communicating with the unsupported input device, according to another example of the present subject matter.

FIG. 1 illustrates a method 100 for subscribing an application to an unsupported input device, according to an example of the present subject matter while FIG. 2 illustrates a method 200 for communicating with an unsupported input device, according to an example of the present subject matter. The order in which methods 100 and 200 are described is not intended to be construed as a limitation, and some of the described method blocks can be combined in a different order to implement the methods 100 and 200, or an alternative method. Additionally, individual blocks may be deleted from the methods 100 and 200 without departing from the spirit and scope of the subject matter described herein. Furthermore, the methods 100 and 200 may be implemented in any suitable hardware, computer-readable instructions, or combination thereof.

The steps of the methods 100 and 200 may be performed by either a computing device under the instruction of machine executable instructions stored on a computer readable medium or by dedicated hardware circuits, microcontrollers, or logic circuits. Herein, some examples are also intended to cover computer readable medium, for example, digital data storage media, which are machine or computer readable and encode machine-executable or computer-executable instructions, where said instructions perform some or all of the steps of the described method methods 100 and 200.

With reference to FIG. 1, method 100 for subscribing applications to an unsupported input device is described.

At block 102, a mapping of hotkeys of an application to be subscribed with a respective function performed by each hotkey in the application is obtained. As explained previously, the mapping of the hotkeys with their corresponding function may be made available by a developer of the application. One example of the mapping of hotkeys with the corresponding functions includes a hotkey, such as a 'right arrow' of a keyboard of a device mapped to a function of moving to next page. Similarly, a hotkey, 'downward arrow' of the keyboard, may be mapped to the function of scrolling a page down. The hotkeys may be application specific. For example, for one application, the hotkey for moving to the next page may be a 'right arrow' of the keyboard, however, for another application, the hotkey for moving to the next page may be a 'CTRL+right arrow' of the keyboard.

In one example, a user, such as a developer or a programmer who may be subscribing the application to an unsupported input may carry out the method 100 in a computing system, referred to as an unsupported input communication system. The user may provide the mapping of the hotkeys with the corresponding functions to the unsupported input communication system.

As shown at block 104, a list of universal identifiers is retrieved, where each of the universal identifiers corresponds to an unsupported input of the unsupported input device, and where each of the universal identifiers is tagged with a function to be performed in the application in response to the corresponding unsupported input.

In one example, the unsupported input device may include a three dimensional (3D) motion sensing controller. Further, the unsupported inputs corresponding to the 3D motion sensing controller may be gesture events, such as 3D motions or inputs by means of movement of eyeballs. For instance, 3D motions may be movements of hands, such as a left-to-right hand movement, a right-to-left hand movement, and custom developed 3D gesture events. According to an example, the 3D motion sensing controller may be a leap Motion™ sensor. The leap Motion™ sensor can track in-air movement of hands and fingers. Each of such gesture events, i.e., in-air movement of hands and fingers is referred to as an unsupported input.

A universal identifier may correspond to each of the gesture events, i.e., to each unsupported input. The universal identifier is a distinctly identifiable name of a gesture event. In the above example, to an unsupported input, left-to-right hand movement, a corresponding universal identifier, 'LEFT-TO-RIGHT SWIPE' may be assigned. Similarly, if the unsupported input is a top-to-bottom hand movement, the assigned universal identifier may be 'TOP-TO-BOTTOM SWIPE'.

In one implementation, the list of universal identifiers may be defined by the user in the unsupported input communication system. For example, the user may enlist the various unsupported inputs that may be received from the unsupported device and assign a universal identifier to each of the unsupported inputs. In another implementation, the list of universal identifiers may be received, in the unsupported input communication system, from an external source, for example a pre-existing list may be retrieved.

Further, in one implementation, each of the universal identifiers may be tagged with a respective function. In one example, the user may tag each of the universal identifiers with a function he wishes to be performed in the application in response to the unsupported input corresponding to the universal identifier. In one implementation, the user may tag the universal identifiers with the respective functions in the unsupported input communication system. For instance, the user may tag a function 'move to next page' to the universal identifier 'LEFT-TO-RIGHT SWIPE' to allow the unsupported input corresponding to the universal identifier 'left-to-right hand movement' to move the application to the next page. Similarly, the user may tag a function 'scroll down the page' to the universal identifier 'TOP-TO-BOTTOM SWIPE' to scroll the page down upon the user performing a top-to-bottom hand movement.

As mentioned previously, the user has the flexibility to tag functions and unsupported inputs based on his preference for each application. Accordingly each application may be customized as per the preference of the user.

As illustrated in block 106, a configuration map is generated for the application. The configuration map includes a mapping of the universal identifiers with the hotkeys. The mapping is such that a universal identifier is mapped to a hotkey that performs a function tagged with the universal identifier. Consider an example where a function 'move to next page' is tagged with the universal identifier 'LEFT-TO-RIGHT SWIPE' corresponding to an unsupported input 'left-to-right hand movement', and the hotkey for moving to the next page is the right arrow of the keyboard. Accordingly, the universal identifier 'LEFT-TO-RIGHT SWIPE' may be mapped to the right arrow of the keyboard. Similarly, in another example, a function 'scroll down the page' tagged with the universal identifier 'TOP-TO-BOTTOM SWIPE', may be mapped to the downward arrow of the keyboard, the downward arrow being the hotkey for scrolling the page down in the application.

In one implementation, the user maps the universal identifiers with the hotkeys of an application in the unsupported input communication system to create the configuration map for the application in the unsupported input communication system.

In one implementation, an editor of the OS of the unsupported input communication system may be accessed for generating the configuration map. In one example, the editor may be a text editor. The user maps one or more universal identifiers with at least one of a plurality of hotkeys for the application in the editor.

Once the configuration map is created for the application, the application is subscribed to the unsupported input device. Further, the configuration map may be updated time to time. For example, new universal identifiers and their corresponding hotkeys may be added into the configuration map, existing universal identifiers and their corresponding hotkeys may be modified, or non-useful universal identifiers and their corresponding hotkeys may be deleted from the configuration map.

Thereafter, the configuration map created for the subscribed application may be provided to a user device to allow execution of the subscribed application based on the configuration map. The user device may execute the subscribed application based on the configuration map for making the subscribed application to interact with the unsupported input device. In one example, the configuration map may be used by a background service of an OS of the user device executing the subscribed application for making the subscribed application interact with the unsupported input device. In one implementation, the user device may be communicatively coupled to the unsupported input communication system to access the configuration map. In one implementation, the execution of the subscribed application may be on the unsupported input communication system itself based on the configuration map created by the user in the unsupported input communication system.

Although, it has been described in method 100 that one application from amongst the plurality of applications is subscribed to the unsupported input device, more than one application may be subscribed to the unsupported input device using the above method blocks. In such a scenario, method blocks 102, 104, and 106 may be repeated for subscribing each application to the unsupported input device.

FIG. 2 illustrates a method 200 for communicating with an unsupported input device. The method 200 provides for making a subscribed application interact with an unsupported input device, according to an example of the present subject matter. According to an implementation, the subscribed application may be one of a native desktop application and a sandboxed application subscribed to the unsupported input device.

In one implementation, the subscribed application may be executing on an operating system (OS) of a device, referred to as a user device. In one implementation, the subscribed application may be preinstalled in the user device. In another implementation, the subscribed application may be installed by downloading from an external source, for example, the Internet. The user device may be understood as any computing device that may include a configuration map for a subscribed application to allow the subscribed application to interact with an unsupported input device. Further, the user device may be coupled to the unsupported input device.

With reference to method 200 as depicted in FIG. 2, an unsupported input is received for the subscribed application, from the unsupported input device at block 202. The unsupported input is for performing a function in the subscribed application. As mentioned previously, the unsupported input device may be a 3D motion sensing controller and the unsupported input may be a gesture event.

In one example, the method 200 may be implemented in the user device executing the subscribed application for making the subscribed application interact with the unsupported input device. The unsupported input, for the subscribed application, may be received by the user device from the unsupported input device coupled to the user device.

At block 204, a tagged universal identifier corresponding to the unsupported input is determined. As described before, each unsupported input from the unsupported input device is assigned a universal identifier. Also, a function that the unsupported input intends to perform in the subscribed application is tagged with the universal identifier. A universal identifier so tagged with the intended function of the associated unsupported input is called as a tagged universal identifier.

For example, an unsupported input, left-to-right hand movement may be received by the user device from the unsupported input device coupled to the user device. The tagged universal identifier, LEFT-TO-RIGHT SWIPE, corresponding to the unsupported input may be determined by the user device.

With reference to block 206 as depicted in FIG. 2, a configuration map of the subscribed application is accessed, where the configuration map comprises a mapping of universal identifiers and corresponding hotkeys for the subscribed application. The configuration map of the subscribed application may be previously generated in accordance with method 100 and be provided to the user device for the user device to execute the subscribed application based on the configuration map.

In one implementation, the configuration map of the subscribed application may be identified from amongst configuration maps of a plurality of subscribed applications in a configuration file. In said implementation, the configuration map of the subscribed application may be identified from the configuration file based on an application name of the subscribed application. For instance, for a windows 8® store application, a package display name present in a package manifest file is the application name of the windows 8® store application.

As shown in block 208, a hotkey mapped to the tagged universal identifier is determined from the configuration map of the subscribed application. As mentioned above, the unsupported input may intend to perform a function in the subscribed application. The configuration map comprises a mapping of the tagged universal identifier with the hotkey responsible for performing the intended function in the subscribed application.

For example, in one implementation, for the tagged universal identifier, LEFT-TO-RIGHT SWIPE, the user device may determine a hotkey 'right arrow' based on the configuration map of the subscribed application.

As depicted in block 210, the determined hotkey is simulated to perform a function associated with the hotkey. Once the determined hotkey is simulated, it may be provided to the subscribed application, with which the user is interacting, to perform the function that the unsupported input intends to perform in the subscribed function.

In one example, the determined hotkey may be simulated by the user device within the OS of the user device to perform the function associated with the hotkey of the subscribed application. For example, a hotkey 'right arrow' may be simulated within the OS, for the subscribe application. Consequently, the function associated with the hotkey, for example, opening of a new page, may be performed in the subscribe application.

Figure 3:
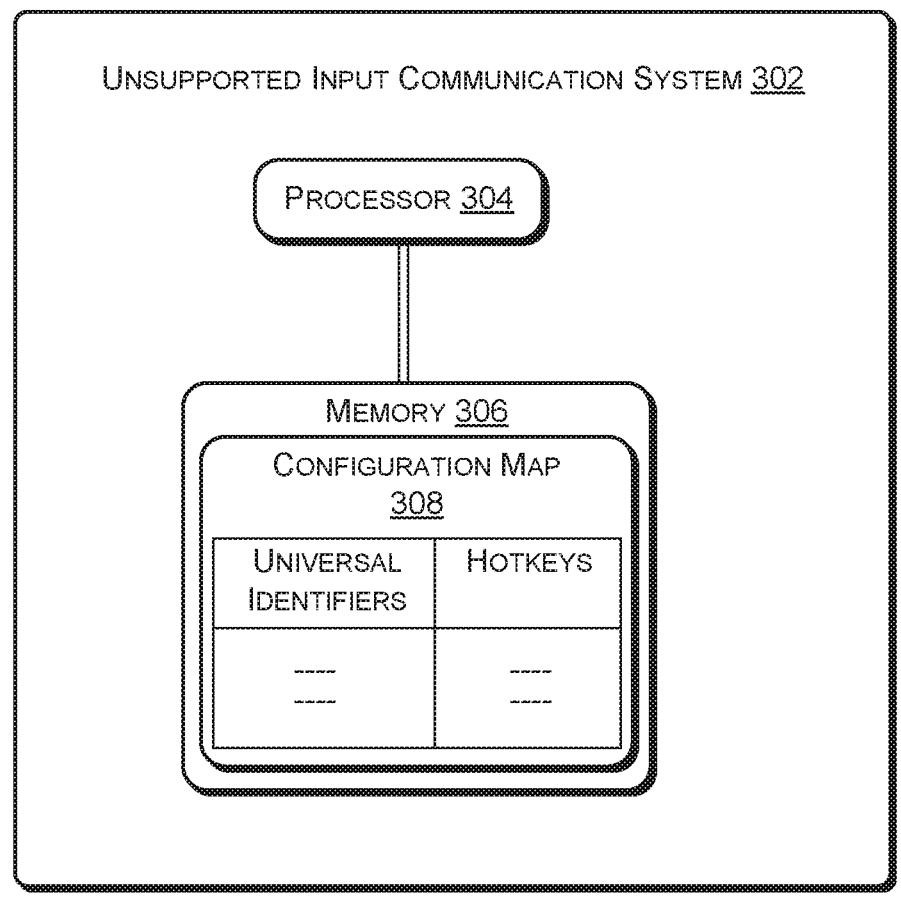
FIG. 3 schematically illustrates an unsupported input communication system, according to an example of the present subject matter.

FIG. 3 schematically illustrates an unsupported input communication system 302, according to an example of the present subject matter. The unsupported input communication system 302 may be any communication or computing device, such as a laptop computer, a desktop computer, a workstation or server.

In one implementation, the unsupported input communication system 302 includes a processor 304, and a memory 306 coupled to the processor 304. The processor 304 may be implemented as one or more microprocessors, microcomputers, microcontrollers, digital signal processors, central processing units, state machines, logic circuitries, and/or any devices that manipulate signals based on operational instructions. Among other capabilities, the processor 304 may be configured to fetch and execute computer-readable instructions stored in the memory 306. The memory 306 may include any computer-readable medium known in the art including, for example, volatile memory, such as static random access memory (SRAM) and dynamic random access memory (DRAM), and/or non-volatile memory, such as read only memory (ROM), erasable programmable ROM, and flash memories.

The memory 306 may also include a configuration map 308 to subscribe an application to an unsupported input device. In one example, the application may be a native desktop application or a sandboxed application. In one implementation, the unsupported input device may be a 3D motion sensing controller, such as a leap Motion™ sensor.

The subscribed application may be understood as an application which is made to support the unsupported input device, such that the subscribed application may understand unsupported inputs generated by the unsupported input device.

In one example, the configuration map 308 of a subscribed application may be created in an editor, such as a text editor, of the unsupported input communication system 302. The generation of the configuration map 308 is based on mapping of hotkeys of the subscribe application to the universal identifiers associated with unsupported inputs, as explained in the description of FIG. 1.

Although, it has been depicted that the memory 306 includes a configuration map 308 of a single subscribed application, multiple configuration maps 308, each corresponding to a different application may exist in the memory 306. The configuration maps 308 created for multiple applications may reside in a configuration file. Accordingly, the configuration file including mapping of universal identifiers and corresponding hotkeys for several applications may be stored in the memory 306.

According to an implementation, the configuration map 308 created for the subscribed application may be used by a user device to execute the subscribed application based on the configuration map 308 for allowing the subscribed application to interact with the unsupported input device. The unsupported input communication system 302, in one implementation, may be communicatively coupled to the user device to provide the configuration map 308 of the subscribed application to the user device for execution of the subscribed application.

Figure 4:
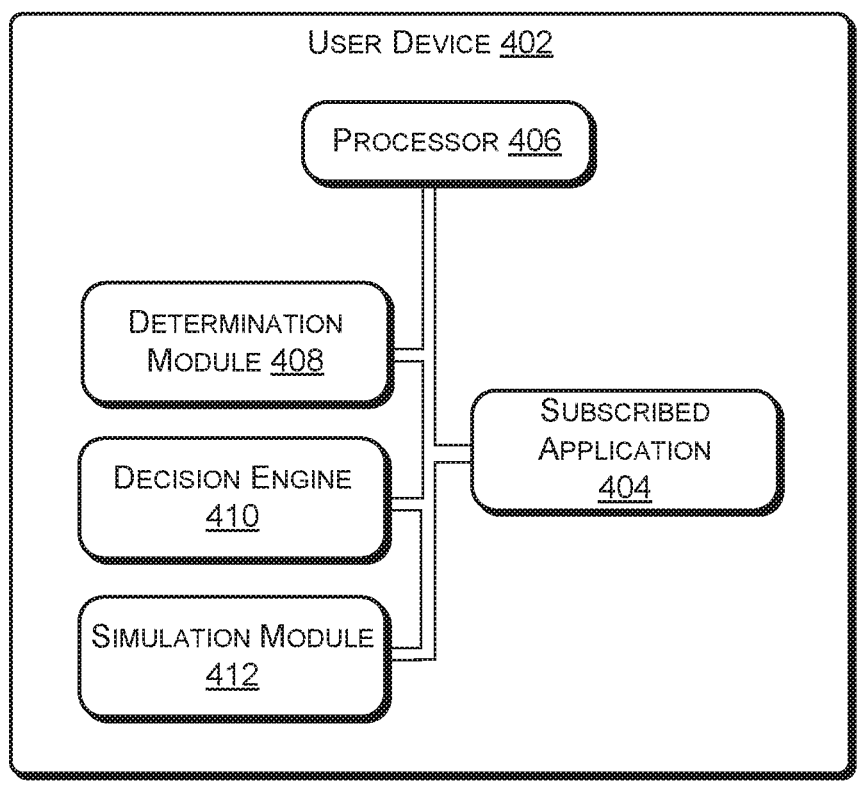
FIG. 4 schematically illustrates a user device executing a subscribed application that interacts with an unsupported input device, according to an example of the present subject matter.

FIG. 4 schematically illustrates a user device 402 executing a subscribed application 404 that interacts with an unsupported input device, according to an example of the present subject matter. The user device 402 may be any communication or computing device, such as a laptop computer, a desktop computer, a workstation and a smart phone.

In one implementation, the user device 402 executes the subscribed application 404, for example, by a processor 406 of the user device 402. The subscribed application 404 may be a native desktop application or a sandboxed application. Further, the user device 402 includes a determination module 408, a decision engine 410, and a simulation module 412, coupled to the processor 406. The processor 406 may be implemented as one or more microprocessors, microcomputers, microcontrollers, digital signal processors, central processing units, state machines, logic circuitries, and/or any devices that manipulate signals based on operational instructions. Among other capabilities, the processor 406 may be configured to fetch and execute computer-readable instructions stored in a memory of the user device 402.

The determination module 408, the decision engine 410, and the simulation module 412, amongst other things, include routines, programs, objects, components, and data structures, which perform particular tasks or implement particular abstract data types. The determination module 408, the decision engine 410, and the simulation module 412 may also be implemented as, signal processor(s), state machine(s), logic circuitries, and/or any other device or component that manipulate signals based on operational instructions. Further, the determination module 408, the decision engine 410, and the simulation module 412 can be implemented by hardware, by computer-readable instructions executed by a processing unit, or by a combination thereof. The user device 402 may also include other module(s) coupled to the processor 406 (not shown in FIG. 4). The other module(s) may include programs or coded instructions that supplement applications or functions performed by the user device 402.

The user device 402 may be coupled to an unsupported input device. In one implementation, the unsupported input device, such as a leap Motion™ sensor may be coupled to the user device 402.

A plurality of applications may be running on the user device 402. Some of these applications may subscribe to the unsupported input device coupled to the user device 402. The user device 402 may include a configuration file comprising a configuration map of each of the subscribed applications 404 of the user device 402.

The configuration map of the subscribed application 404 may include a mapping of universal identifiers and corresponding hotkeys. In the configuration map, a universal identifier may be mapped to a hotkey that performs a function tagged with the universal identifier. In one implementation, the configuration file having the configuration map of the subscribed application 404 may be preinstalled in the user device 402. In another implementation, the user device 402 may be communicatively coupled to the unsupported input communication system 302, to access the configuration map for the subscribed application 404.

According to an implementation, a user may wish to interact with a subscribed application 404, running on the user device 402, through the unsupported input device, such as the 3D motion sensing controller coupled to the user device 402. For example, the user may want the subscribed application 404 to move to a next page. Accordingly, the user may provide an unsupported input, for example, a left-to-right hand movement, corresponding to the function of moving to the next page to the user device 402. When the user moves his hand from left-to-right, the unsupported input device captures the unsupported input, left-to-right hand movement, and provides it to the user device 402. The unsupported input is for performing a function in the subscribed application 404.

In one implementation, the determination module 408 may determine, for the subscribed application 404, a tagged universal identifier corresponding to the captured unsupported input. Taking the above example where the unsupported input is left-to-right hand movement, the tagged universal identifier corresponding to the left-to-right hand movement may be a LEFT-TO RIGHT SWIPE.

Upon determination of the universal identifier, the decision engine 410 may identify a hotkey mapped to the tagged universal identifier based on the configuration map of the subscribed application 404. The hotkey may be understood as a key or a combination of keys of a keyboard that trigger a function in the subscribed application. According to an implementation, to identify the hotkey corresponding to the tagged universal identifier, the decision engine 410 may access the configuration file comprising the configuration map of the subscribed application 404.

The configuration file may include the configuration map of the subscribed application 404 along with the configuration maps of several other subscribed applications running on an operating system (OS) of the user device 402. In such a scenario, the decision engine 410 may identify the configuration map of the subscribed application with which the user wishes to communicate, from the configuration file, based on an application name of the subscribed application. For instance, for a sandboxed application, such as a windows 8® store application, a package display name present in a package manifest file is the application name of the windows 8® store application.

The decision engine 410 determines the hotkey mapped to the tagged universal identifier based on the configuration map of the subscribed application 404. The function associated with the determined hotkey is the function intended to be performed by the unsupported input. In the present example, the universal identifier 'LEFT-TO RIGHT SWIPE' is associated with left-to-right hand movement that intends to perform a function 'move to next page'. Accordingly, the decision engine 410 identifies the hotkey associated with the function of moving to the next page. In one example, the 'right arrow' of a keyboard coupled to the user device 402 may be the hotkey associated with the function of moving to next page. Thus, the decision engine 410 may identify the 'right arrow' as the hotkey.

Once the hotkey corresponding to the universal identifier is determined by the decision engine 410, the simulation module 412 may simulate the determined hotkey to perform the intended function in the subscribed application 404. Referring again to the previous example, for the universal identifier 'LEFT-TO RIGHT SWIPE', the determined hotkey, 'right arrow' is simulated within the OS of the user device 402, for the subscribed application 404.

Once, the determined hotkey is simulated for the subscribed application 404 in the OS, the subscribed application 404 performs the function associated with the hotkey. Accordingly, in the present example, when the determined hotkey 'right arrow' is simulated, the subscribed application 404 moves to the next page. Thus, in response to the left-to-right hand movement performed by the user, the subscribed application 404 is moved to a next page. Interactions between the unsupported input device and the subscribed application 404 are thus carried out based on the configuration map of the subscribed application 404.

Figure 5:
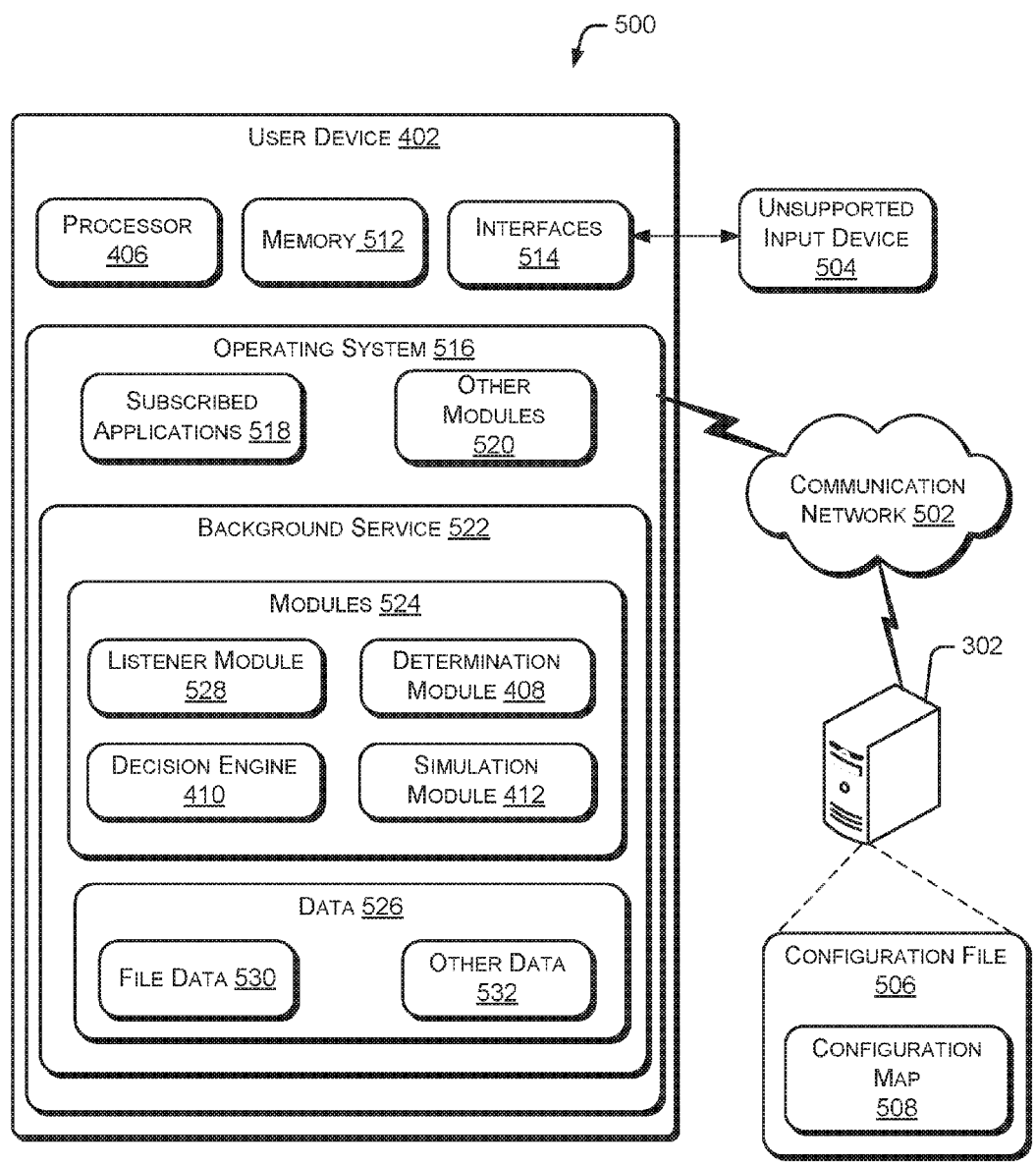
FIG. 5 schematically illustrates a system for communicating with unsupported inputs devices, according to another example of the present subject matter.

FIG. 5 schematically illustrates a system 500 for communicating with unsupported inputs devices, according to one example of the present subject matter. The system 500 allows applications to subscribe to unsupported input devices and further provides for applications to interact with such unsupported input devices.

The system 500 comprises the user device 402 communicatively coupled to the unsupported input communication system 302 over a communication network 502. The communication network 502 may include a Global System for Mobile Communication (GSM) network, a Universal Mobile Telecommunications System (UMTS) network, or any other communication network that use any of the commonly used protocols, for example, Hypertext Transfer Protocol (HTTP) and Transmission Control Protocol/Internet Protocol (TCP/IP).

In one implementation, the user device 402 may be communicatively coupled to an unsupported input device 504. In one implementation, the unsupported input device 504 may be three dimensional (3D) motion sensing controller, such as a leap Motion™ sensor.

The unsupported input communication system 302 may include a configuration file 506 having a configuration map 508 created to subscribe applications to the unsupported input device 504. The configuration map 508 may be made accessible to the user device 402. Based on the configuration map 508, one or more applications executing on the user device 402 may be subscribed to the unsupported input device 504. A subscribed application may be understood as an application which is made to support the unsupported input device 504, such that the subscribed application may understand unsupported inputs generated by the unsupported input device 504.

In an implementation, as described previously, the user device 402 includes processor 406, and a memory 512 connected to the processor 406. The user device 402 also includes interface(s) 514. The interfaces 514 may include a variety of commercially available interfaces, for example, interfaces for peripheral device(s), such as data input output devices, referred to as I/O devices, storage devices, network device. The I/O device(s) may include Universal Serial Bus (USB) ports, Ethernet ports, host bus adaptors, and their corresponding device drivers. The interface(s) 514 facilitate the communication of the user device 402 with various communication and computing devices and various communication networks, such as networks that use a variety of protocols, for example, Hypertext Transfer Protocol (HTTP) and Transmission Control Protocol/Internet Protocol (TCP/IP). In one implementation, the interface(s) 514 couple the unsupported input device 504 to the user device 402.

The user device 402 may further include an operating system 516. The operating system 516 may execute multiple applications. From amongst the multiple applications, one or more applications, referred to as subscribed applications 518, may be subscribed to the unsupported input device 504. Other modules 520 may also execute on the operating system 516. The other module 520 of the operating system 516 may include programs or coded instructions that supplement applications or functions performed by the user device 402.

Additionally, the operating system 516 may also execute a background service 522, a service that may be running in the background of the operating system 516 of the user device 402. The background service 522 includes modules 524 and data 526. Further, the modules 524 may include a listener module 528, the determination module 408, the decision engine 410, and the simulation module 412. The data 526 may include file data 530 and other data 532. The file data 530 may store the configuration map 508 accessed from the unsupported input communication system 302. The other data 532 may include data generated and saved by the modules 524 for providing various functionalities of the user device 402.

According to an implementation, a user may interact with at least one of the subscribed applications 518 through the unsupported input device 504 based on the configuration file 506 having configuration maps 508. In one implementation, to allow communication with subscribed application through the unsupported input device 504, the user device 402 may access the configuration file 506 from the unsupported input communication system 302 over the communication network 502 and store in the file data 530. In another implementation, the user device 402 may access the configuration file 506 from the unsupported input communication system 302 in real-time to enable subscribed applications 518 executing on the user device 402 to interact with the unsupported input device 504.

The configuration file 506 may include a mapping of universal identifiers and corresponding hotkeys for each of the subscribed applications 518. The mapping is such that a universal identifier is mapped to a hotkey that performs a function tagged with the universal identifier. Further, the function tagged with the universal identifier is a function to be performed in a subscribed application in response to an unsupported input from the unsupported input device 504.

The unsupported input device 504 described in the previous example, is a 3D motion sensing controller. Accordingly, the unsupported inputs may be gesture events, such as a right-to-left hand movement, a left-to-right hand movement, a bottom-to-top hand movement, a top-to-bottom hand movement, and custom developed 3D gesture events.

In operation, when an unsupported input, such as a hand movement from top-to-bottom is performed by a user to interact with the at least one subscribed application 518, the 3D motion sensing controller captures the hand movement. The listener module 528 may receive the unsupported input from the unsupported input device 504. The determination module 408 may then identify a universal identifier corresponding to the unsupported input i.e., the top-to-bottom hand movement in this case. The universal identifier may be understood as a distinctly identifiable name assigned to an unsupported input. In the present example, the universal identifier corresponding to the top-to-bottom hand movement may be TOP-TO-BOTTOM SWIPE.

Further, the universal identifier may be tagged with a function that the corresponding unsupported input intends to perform in the subscribed application 518 in response to unsupported input. For example, if it is intended for a subscribed application to scroll down a page in response to a top-to-bottom hand movement, a universal identifier 'TOP-TO-BOTTOM SWIPE' may be assigned to the unsupported input and the function of scrolling down a page may be tagged with this universal identifier.

Upon identifying the universal identifier corresponding to the unsupported input, the decision engine 410 may identify a configuration map of the subscribed application 518, with which the user is interacting, from the configuration file 506 based on an application name of the subscribed application 518.

The decision engine 410 may then determine a hotkey mapped to the universal identifier based on the configuration map 508 of the subscribed application 518. As explained previously, in a configuration map, a universal identifier is mapped to a hotkey that performs a function tagged with the universal identifier. For example, if the universal identifier is TOP-TO-BOTTOM SWIPE and it intends to perform a function of scrolling down a page, then the hotkey associated with the function 'scroll down the page' is mapped to the universal identifier. Accordingly, a hotkey 'downward arrow', associated with the function of scrolling down a page, may be determined from the identified configuration map for the universal identifier TOP-TO-BOTTOM SWIPE.

After the hotkey corresponding to the universal identifier is determined from the configuration map 508, the simulation module 412 may simulate the determined hotkey to perform a function associated with the hotkey in the subscribed application 518. For example, if the determined hotkey is 'downward arrow', the same is simulated within the operating system 516 of the user device 402. Once, the determined hotkey is simulated, the simulation module 412 sends the simulated hotkey to the subscribed application 518. The subscribed application 518 may then translate the simulated hotkey into the function associated with that hotkey in the subscribed application 518. Thus, in effect, in the foregoing example, the subscribed application 518 scrolls a page in response to the unsupported input of top-to-bottom hand movement provided through the 3D motion sensing controller.

Although FIG. 5 is described with respect to the 3D motion sensing controller, however, the description can be extended to any unsupported input device.

According to the present subject matter, an application may communicate with an unsupported input device based on simulation of relevant hotkeys. The system and method of communicating with an unsupported input device does not involve additional codes to be coded for the application. Further, no redevelopment of the application is involved. Furthermore, in accordance with the present system and method, even sandboxed applications may be enabled to communicate with unsupported input device. The system and method of communicating with an unsupported input device allow applications to be customized based on user preferences.

Figure 6:
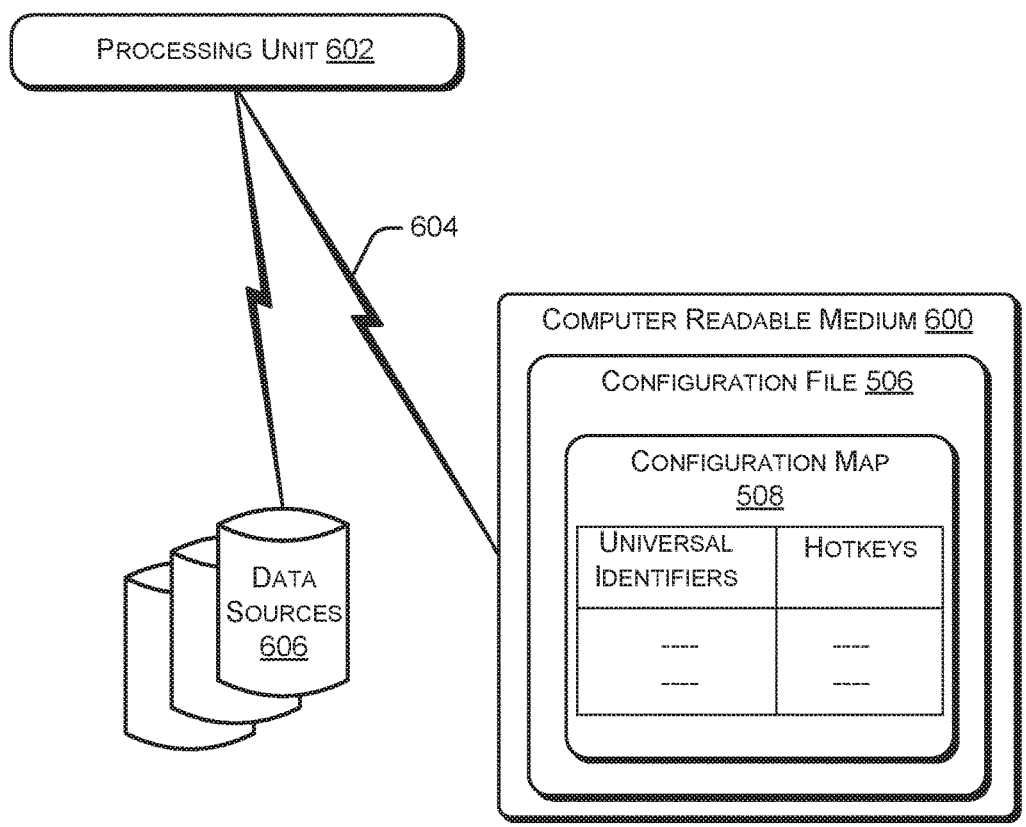
FIG. 6 illustrates a computer readable medium storing instructions for making a subscribed application interact with an unsupported input device, according to an example of the present subject matter.

FIG. 6 illustrates a computer readable medium 600 storing instructions for making a subscribed application interact with an unsupported input device, according to an example of the present subject matter. In one example, the computer readable medium 600 is communicatively coupled to a processing unit 602 over a communication link 604.

For example, the processing unit 602 can be a computing device, such as a server, a laptop, a desktop, a mobile device, and the like. The computer readable medium 600 can be, for example, an internal memory device or an external memory device, or any commercially available non transitory computer readable medium. In one implementation, the communication link 604 may be a direct communication link, such as any memory read/write interface. In another implementation, the communication link 604 may be an indirect communication link, such as a network interface. In such a case, the processing unit 602 can access the computer readable medium 600 through a network. The processing unit 602 and the computer readable medium 600 may also be communicatively coupled to data sources 606 over the network. The data sources 606 can include, for example, databases and computing devices. The data sources 606 may be used by the requesters and the agents to communicate with the processing unit 602.

In one implementation, the computer readable medium 600 includes a set of computer readable instructions, such as a configuration file 506 having a configuration map 508 of a subscribed application. The set of computer readable instructions can be accessed by the processing unit 602 through the communication link 604 and subsequently executed to perform acts for unsupported input communication.

On execution by the processing unit 602, a mapping of universal identifiers and corresponding hotkeys present in the configuration map 508 may be used for executing the subscribed application to interact with an unsupported input device.

Although implementations for communicating with an unsupported input device have been described in language specific to structural features and/or methods, it is to be understood that the appended claims are not necessarily limited to the specific features or methods described. Rather, the specific features and methods are disclosed as examples of systems and methods for communicating with the unsupported input device.

We claim:

1. A method for subscribing an application to an unsupported input device, the method comprising:

obtaining, for the application to be subscribed to the unsupported input device, a mapping of each of a plurality of hotkeys with a corresponding function performed in the application;

retrieving a pre-existing list of universal identifiers wherein, at the time of retrieval, each of the universal identifiers corresponds to an unsupported input of the unsupported input device, wherein the unsupported input is not supported by the application, and wherein each of the universal identifiers is tagged with a function to be performed in the application in response to the corresponding unsupported input; and generating a configuration map for the application, wherein the configuration map comprises a mapping of at least one universal identifier from amongst the pre-existing list of universal identifiers of the unsupported input device with at least one of the plurality of hotkeys of the application, such that the at least one universal identifier is mapped to the at least one of the plurality of hotkeys that is to perform the function that is tagged with the at least one universal identifier of the pre-existing list of universal identifiers.

2. The method as claimed in claim 1 further comprising providing the configuration map to a user device executing the application.

3. The method as claimed in claim 1 further comprising tagging each of the universal identifiers with the function to be performed in response to the corresponding unsupported input.

4. The method as claimed in claim 1, wherein the configuration map is generated in an editor of an unsupported input communication system.

5. The method as claimed in claim 1, wherein the application is one of a native desktop application and a sandboxed application.

6. The method as claimed in claim 1, wherein the unsupported input device is a three dimensional (3D) motion sensing controller.

7. A user device comprising:

a processor;

a determination module, coupled to the processor, to determine, for at least one subscribed application, a tagged universal identifier from a pre-existing list of universal identifiers corresponding to an unsupported input received from an unsupported input device, wherein the unsupported input is not supported by the at least one subscribed application and is for performing a function in the at least one subscribed application;

a decision engine, coupled to the processor, to determine a hotkey for the at least one subscribed application mapped to the tagged universal identifier of the pre-existing list of universal identifiers of the unsupported input device, wherein the hotkey is associated with the function; and a simulation module, coupled to the processor, to simulate the determined hotkey to perform the function in the at least one subscribed application.

8. The user device as claimed in claim 7, wherein the user device is coupled to the unsupported input device.

9. The user device as claimed in claim 7, wherein the unsupported input is a gesture event.

10. The user device as claimed in claim 7 further comprising a listener module, coupled to the processor, to receive the unsupported input from the unsupported input device for the at least one subscribed application.

11. The user device as claimed in claim 7, wherein the decision engine identifies the hotkey mapped to the tagged universal identifier based on a configuration map, the configuration map comprising a mapping of universal identifiers and corresponding hotkeys of the at least one subscribed application, such that a universal identifier is mapped to a hotkey that performs a function tagged with the universal identifier.

12. The user device as claimed in claim 7 further comprising a file data, coupled to the processor, wherein the file data includes a configuration file comprising configuration maps of applications of the user device that subscribe to the unsupported input device.

13. The user device as claimed in claim 12, wherein the unsupported input device is a leap motion™ sensor.

14. The user device as claimed in claim 7, wherein the at least one subscribed application is one of a native desktop application and a sandboxed application subscribed to the unsupported input device.

15. A non-transitory computer-readable medium having a set of computer readable instructions that, when executed, cause a user device to:
  receive an unsupported input from an unsupported input device for at least one subscribed application, wherein the unsupported input is not supported by the at least one subscribed application and is for performing a function in the at least one subscribed application;
  identify, for at least one subscribed application, a tagged universal identifier from a pre-existing list of universal identifiers corresponding to the unsupported input;
  determine a hotkey of the at least one subscribed application mapped to the tagged universal identifier of the pre-existing list of universal identifiers of the unsupported input device, wherein the hotkey is associated with the function; and
  simulate the determined hotkey to perform the function in the at least one subscribed application.

\* \* \* \* \*